United States Patent
Sadovsky et al.

(10) Patent No.: US 7,362,462 B2
(45) Date of Patent: Apr. 22, 2008

(54) SYSTEM AND METHOD FOR RULES-BASED IMAGE ACQUISITION

(75) Inventors: Vladimir Sadovsky, Bellevue, WA (US); William M. Crow, Sequim, WA (US); Cyra Richardson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 10/608,437

(22) Filed: Jun. 30, 2003

(65) Prior Publication Data

US 2004/0268251 A1   Dec. 30, 2004

(51) Int. Cl.
*G06F 3/12* (2006.01)
*G06F 15/00* (2006.01)

(52) U.S. Cl. .................... 358/1.15; 358/1.6; 348/207.1

(58) Field of Classification Search ............... 358/1.15, 358/1.13, 1.1, 1.18, 1.6, 1.2, 1.9, 1.16, 1.17; 382/181; 348/207.1, 207.11, 211.2, 211.3, 348/231.2

See application file for complete search history.

(56) References Cited

U.S. PATENT DOCUMENTS

2003/0072488 A1* 4/2003 Barsness et al. ............ 382/181

* cited by examiner

*Primary Examiner*—Dov Popovici
(74) *Attorney, Agent, or Firm*—Shook, Hardy & Bacon LLP

(57) ABSTRACT

A method and system are provided for allowing a user to manage captured images automatically. The method includes establishing a connection between a computing device and an image capturing device and defining a set of rules pertaining to an image using the computing device. The method additionally includes transferring captured images from the image capturing device to the computing device. The set of rules governs actions performed after acquisition of each image. In order to manage the captured images, the receiving computing device interprets the associated rules. The method additionally includes managing the captured image in accordance with the associated image rule. The system includes the tools necessary to execute the aforementioned method.

41 Claims, 9 Drawing Sheets

SYSTEM AND METHOD FOR RULES-BASED IMAGE ACQUISITION

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

This invention relates to the field of image capturing devices and more particularly to management of captured images.

BACKGROUND OF THE INVENTION

Digital cameras have become more affordable and the number of digital photos taken for personal use has grown rapidly. While digital technology enables high quality photographs, the individuals taking the photographs are often novices who are unable to fully utilize the technology due to their lack of knowledge. Users dealing with a large number of image acquisitions may become particularly overburdened. The users may be burdened with the task of sorting through the images and directing them to multiple storage devices.

In order to assist the novice users, digital camera manufacturers have taken steps to incorporate extensive instructional materials. These instructional materials are often cumbersome and users do not take the time to fully explore them.

Current processes are available for allowing a user to transfer an image from a capturing device to an end user application or directly into storage. Some computer operating systems facilitate a method of acquiring still and photographic images from acquisition devices such as scanners, digital cameras, and video cameras, and inserting the images into end user applications. Although these acquisition methods may be user-friendly, the operations generally require user action or authorization and are not performed automatically.

As photographic devices incorporate increasing amounts of internal storage for images, the acquisition task for the user is also increasing. The importance of easily organizing images stored in permanent user storage is also increasing, as the user is required to spend a substantial amount of time searching a larger number of images.

Image capturing device makers generally focus on improvements to the image capturing device, underestimating the impact that an external computer might have on simplifying the user experience. Furthermore, image capturing device-focused schemes usually target image transfers from device-to-device, and thus ignore the power of the computer as an arbiter.

Accordingly, a technique is needed for helping users to manage distribution and storage of photographs in an efficient manner. A system and method are needed for minimizing management overhead for a user. Image acquisition through a personal computer operating system should continue to become more automated and flexible, while matching end user intentions. Such a technique would provide users incentive to take more photographs since storage space would be enhanced by the efficient distribution. End users would benefit from intelligent help that computer software can provide by analyzing image content in order to facilitate image distribution.

SUMMARY OF THE INVENTION

In one aspect, the present invention is directed to a method for managing digital images. The method includes establishing a connection between a computing device and an image capturing device and defining a set of rules pertaining to an image using the computing device. The method additionally comprises applying the set of rules from the computing device to an image captured by the image capturing device, such that the set of rules governs actions performed upon acquisition of the captured image.

In a further aspect, the present invention includes a system for managing digital images. The system includes rules editing and configuration tools and a rules engine for allowing a user to configure image rules for controlling images captured by an image capturing device. The system also comprises connectivity tools for establishing a connection between the rules engine and the image capturing device and for transferring the images from the image capturing device and allowing application of the set of image rules to the images.

In yet a further aspect, the invention includes a method for managing digital images. The method includes defining a set of rules using a computing device and receiving a set of transferred images from an image capturing device. The method additionally comprises applying the set of rules from the computing device to the set of transferred images from the image capturing device.

In an additional aspect, the invention includes a method for managing captured images stored on a computing device. The method includes receiving at least one captured image in association with an associated image rule at the computing device and interpreting the associated image rule at the computing device. The method additionally includes managing the captured image in accordance with the associated image rule.

In a further aspect, the invention includes a system for managing captured images. The system includes an image transfer engine within an image capturing device for transferring a captured image and an image acquisition engine for receiving the captured image. The system additionally includes a rules engine for interpreting an associated rule in order to manage the captured image in accordance with the associated rule.

BRIEF DESCRIPTION OF THE DRAWINGS

The present invention is described in detail below with reference to the attached drawing figures, wherein.

DETAILED DESCRIPTION OF THE INVENTION

Figure 1:
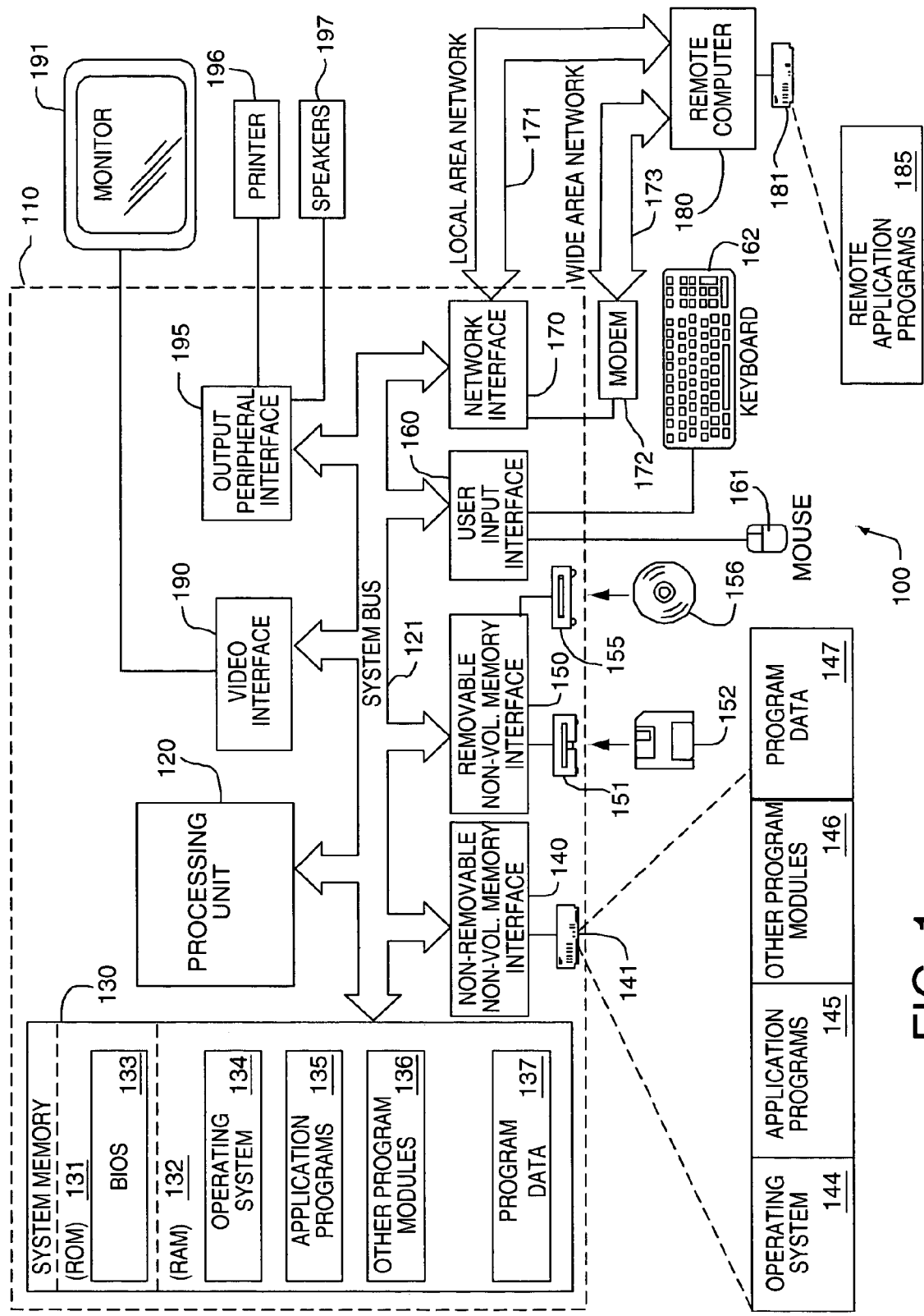
FIG. 1 is a block diagram of a suitable computing system environment for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks or connections such as a Bluetooth wireless Personal Area Network (PAN) connection.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
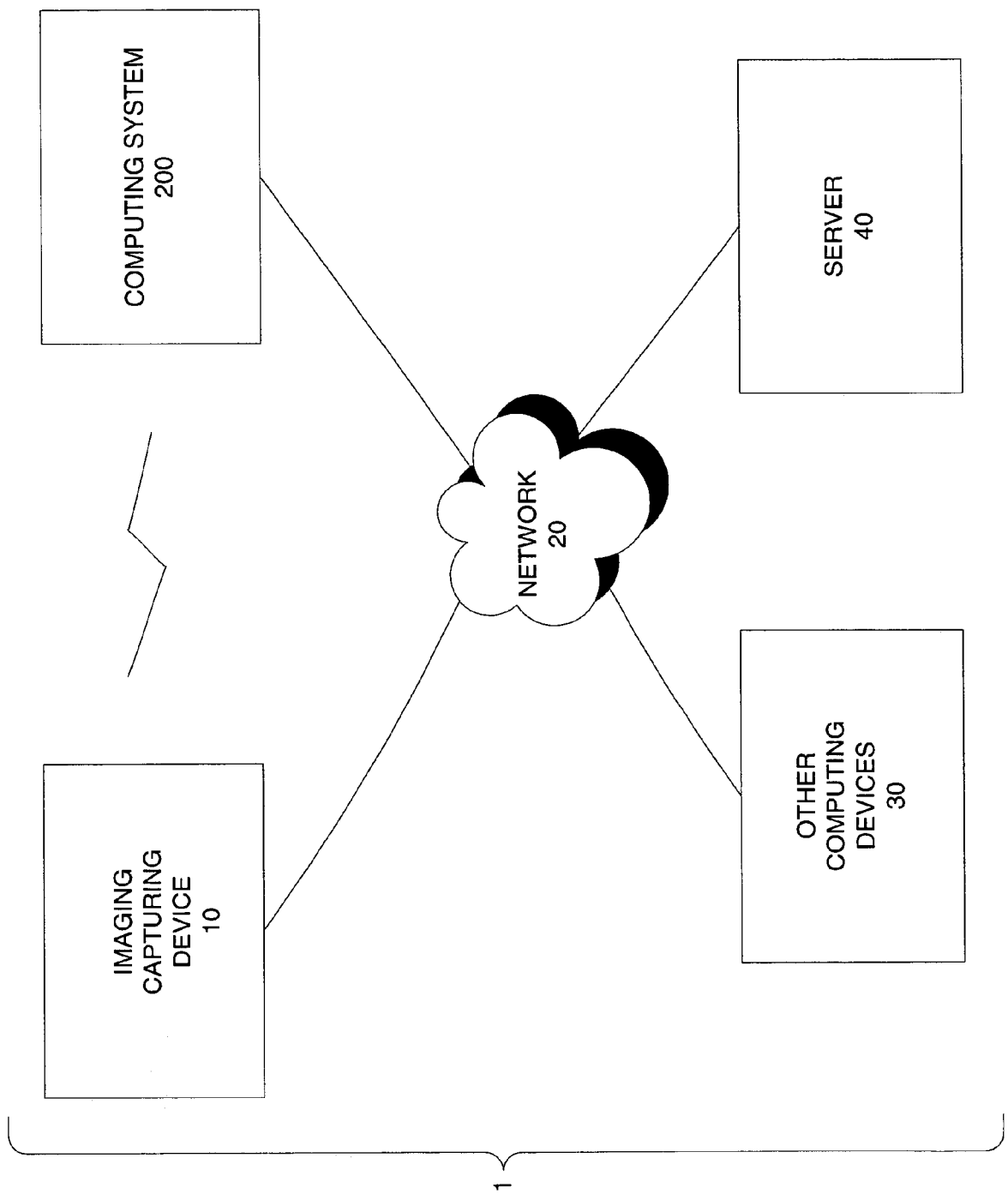
FIG. 2 is a block diagram showing a components of a first embodiment of a system of the invention.

FIG. 2 is a block diagram showing a system 1 in accordance with an embodiment of the invention. The system 1 includes an image capturing device 10 capable of communicating with a computing system 200. The computing system 200 may communicate over a network 20 with other computing devices 30 and a server 40. These components may be of any configuration similar to those described above with reference to FIG. 1.

Figure 3:
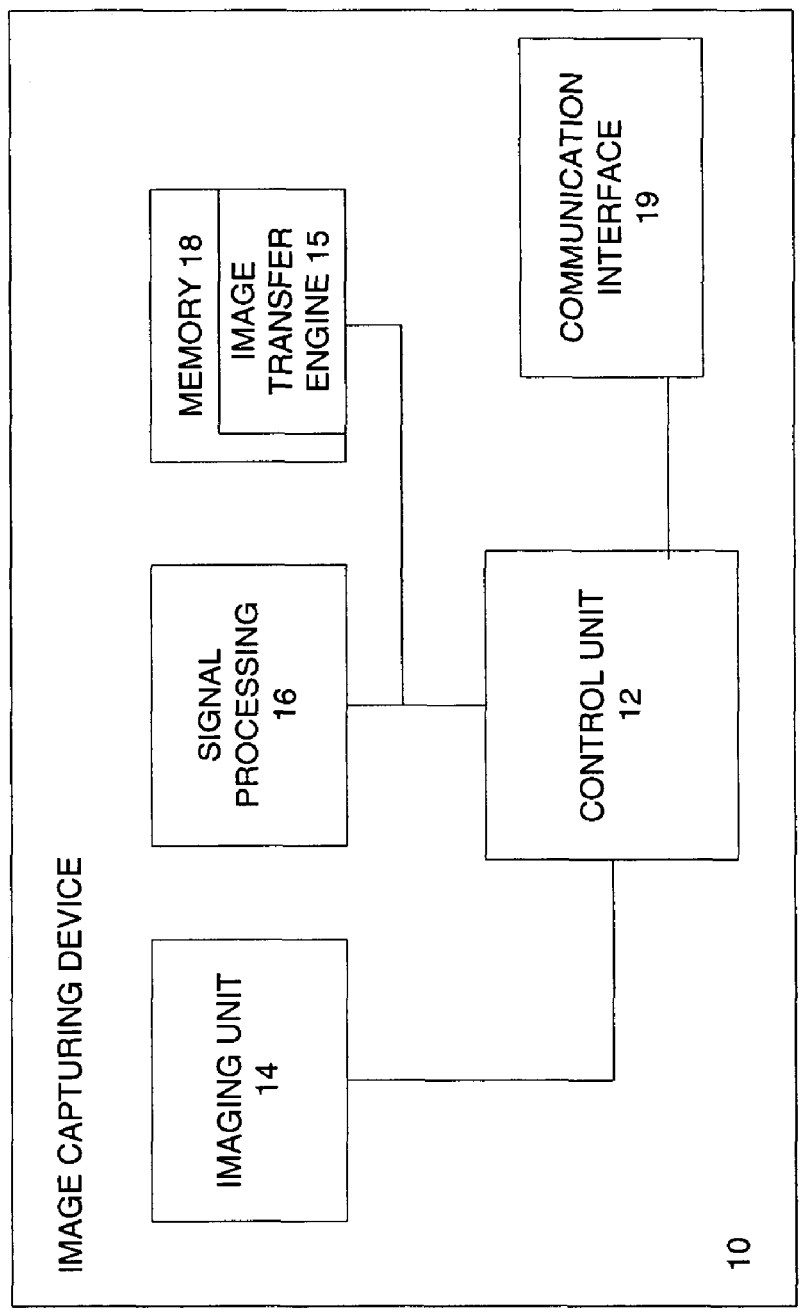
FIG. 3 is a block diagram illustrating an image capturing device in accordance with an embodiment of the invention.

FIG. 3 illustrates an image capturing device 10 including an imaging unit 14, a signal processing device 16, a memory 18, a control unit 12 and a communication interface 19. The communication interface 19 enables the image capturing device 10 to interact with the computing system 200. The communication interface 19 may be an interface that requires the camera to be directly plugged into the computer system 200 or may be connected to the computer system 200 over a network 20 such as the Internet. In one embodiment, the image capturing device 10 is connected with the computer system 200 via a wireless interface. The wireless interface may result in a continuous connection in which photograph management occurs in real time. The memory 18 of the image capturing device 10 also stores an image transfer engine 15. As will be described below, the image transfer engine 15 may respect system, device, or user-encoded rules. The image capturing device 10 may be a scanner, a digital camera, a video camera, or other device capable of capturing images.

Figure 4:
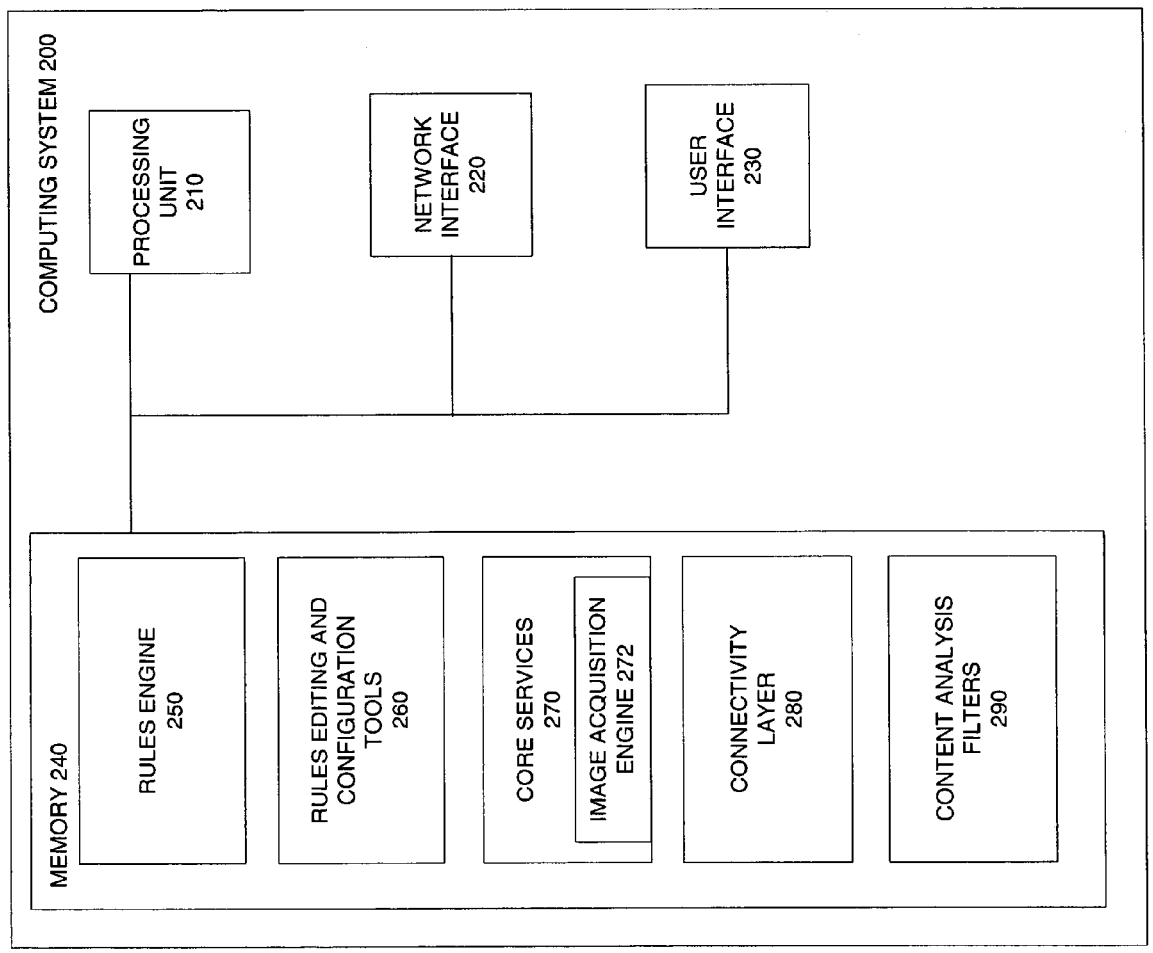
FIG. 4 is a block diagram illustrating an embodiment of a computing system used in the system of the invention.

FIG. 4 illustrates a computing system 200 in accordance with an embodiment of the invention. The computing system 200 may include a processing unit 210, a network interface 220, a user interface 230, and a memory 240. The memory 240 may store a rules engine 250, rules editing and configuration tools 260, core services 270, a connectivity layer 280, and content analysis filters 290. The core services 270 include an image acquisition engine 272 for facilitating acquisition of images from the image transfer engine 15.

Figure 5:
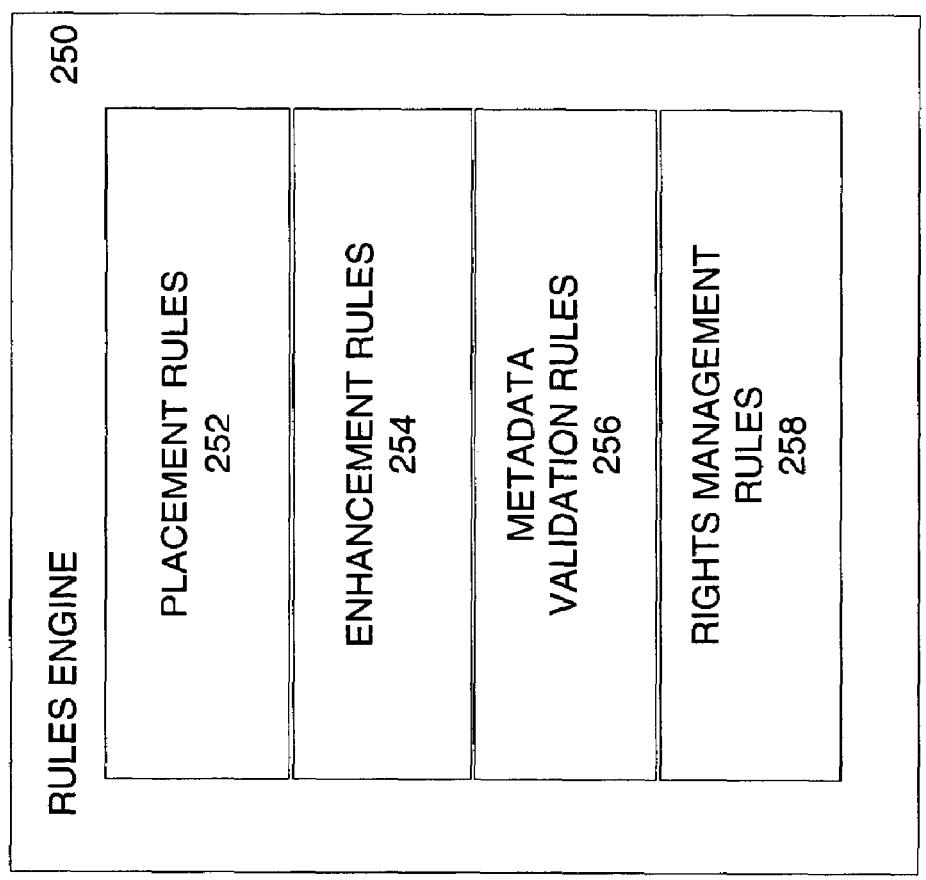
FIG. 5 is a block diagram illustrating a rules engine in accordance with an embodiment of the invention.

FIG. 5 further illustrates the components of the rules engine 250. The rules engine 250 includes a plurality of categories of rules including placement rules 252, enhancement rules 254, metadata validation rules 256, and rights management rules 258. The rules may be standardized rules provided by an operating system supplier, a device manufacturer, or a third party software supplier, or alternatively may be custom-created by the user. In combination, the rules may completely describe what happens to an image when it leaves the image capturing device 10 and moves to the computer system, 200 or 300, or network 20. Everything that will happen with the captured image can be predefined to occur automatically. The rules can include a generic rules set provided ahead of time or a rule set for each picture. The rules can be dependent on the content of the captured images. For instance, placement rules 252 may direct the computer system 200 to store a captured image in a particular file if the captured image has pre-defined content. In this example, the receiving system would invoke content analysis filters 290 to assist the image acquisition engine 272 with determining the proper placement rule 252 for application. The rules will preferably be encoded into a standardized form that does not require translation.

The placement rules 252 determine where an image will be stored after it is captured and transferred. The placement rules 252 can base routing of the captured image on the content of the image and determine the location where the captured image will be stored. Content can be assessed through an analysis of imaging characteristics and metadata fields. The placement rules 252 can also base placement on the date and time the image was captured, on the identity of the photographer, or on any number of factors to be designated by the user. The user can designate placement rules as global or as session-specific. Session specific placement rules may have priority over global placement rules.

The enhancement rules 254 enable the computer system 200 to enhance or improve an image after it has been transferred from the image capturing device 10. The enhancement rules can be provided by the user, the image capturing device manufacturer, or the software supplier. The enhancement rules 254 are related to quality and may compensate for common errors such as over or under exposure. The enhancement rules 254 will search for common defects and correct them. Application of the enhancement rules 254 can save the user a trip to a photo shop by performing such enhancements on the user's own system computer 200 or on any other computer system to which the captured image may be routed.

The metadata validation rules 256 change metadata fields of captured images to conform to user created restrictions and constraints. The metadata validation rules 256 may add a name to a captured image or code a captured image with data. The metadata validation rules 256 can reset a camera date field to the image acquisition date or set an author name to the name of a user who is logged on in order to allow future management.

Rights management rules 258 may restrict user access to captured images. The user may restrict the captured images so that all viewers must be authorized. The user may submit a list of authorized individuals and require entry of a password, email address, or other indicator to verify authorization.

The above identified rules 252, 254, 256, and 258 may generally be retained in storage on the computing device 200 but also may be placed directly in captured images by the image capturing device 10. Alternatively, the rules 252, 254, 256, and 258 may be placed in alternative storage in the image capturing device 10 to be transferred as a set along with a set of captured images.

As shown in FIG. 4, the image acquisition core services 270 include an image acquisition engine 272 and may be extended to install, register and invoke the rules 252, 254, 256, and 258 of the rules engine 250 in a secure and robust fashion. The core services 270 are activated every time the image capturing device 10 is connected. Additional services are provided that may be called by the rules engine 250 to get access to device and session parameters, image data and metadata, and storage facilities per image and per device. The core services 270 have the central function of interacting with the user interface 230, computing device 300, and server 40. The core services 270 may directly populate data storage devices and may transfer images to the user interface 230. The core services 270 also interact with the connectivity layer 280 to receive the rules downloaded in combination with captured images. Regardless of whether the rules are stored on the computing device 200 or are transferred from the image capturing device 10 as a set or inside of each image, the image acquisition engine 272 of the core services 270 and the rules engine 250 will interpret the rules upon transfer of the captured images. The user can turn on and off individual rules and can enter separate parameters to serve as run time context for the acquisition engine 272. The image acquisition engine 272 accesses a system of encoded rules and constraints present in the rules engine 250. If the image capturing device 10 is able to store per image/per media/per device rules, the rules can be accessed at the beginning of a session negotiation with the image capturing device 10 and stored in a per-session memory. Upon receipt of transferred images, the image acquisition engine 272 may access the above-described content analysis filters in order to ensure that treatment of captured images is consistent with any content-specific rules. Although it is generally the placement rules 252 that are content dependent, other rules, such as the rights management rules 258 may also be content dependent such that only authorized users will be able to view captured images with predefined content. Rules may be translated into standardized form by the image acquisition engine 272 if such translation is necessary.

The connectivity layer 280 provides necessary communication channels to allow the rules engine 250 to communicate with the image capturing device 10 in order to obtain standard and proprietary parameters, allowing useful aggregation of information. The rules, 252, 254, 256, and 258 may be implemented during image acquisition, but may also be implemented at any other time.

The rules editing and configuration tools 260 assist the user in setting rules when the image capturing device 10 is connected with the computer system 200. The user can set rules through the user interface 230 that communicates with the rules editing and configuration tools 260 to revise the content of the rules engine 250. During an installation phase, the computer system 200 sets the rules in the rules engine 250. The computer system 200 may retain the stored rules or may transfer the rules to the image capturing device 10 through the connectivity layer 280. The rules can be custom-created by the user or may have been prepackaged by a software vendor or device manufacturer. If the rules are pre-packaged, the user interface 230 may present selections to the user.

The captured images prepared for transfer may contain all relevant information regarding future disposition of the captured images if the rules have been transferred to the image capturing device 10. Otherwise, the computer system 200 and the image capturing device 10 establish a connection after image capture. Stored rules may direct the receiver of a transferred image to archive the images to a storage facility on network or to mail 4×6 prints to a selected address. Each image may include an instruction to a receiving system to print three copies of the image. These actions save the user time and may save the user a trip to the photo shop.

A key implementation area is wireless technology. When the invention utilizes wireless technology, the image capturing device 10 will transfer images whenever it comes into contact with a wireless hotspot. When the image capturing device 10 detects the wireless network, it establishes a connection and transfers captured images in accordance with pre-set rules. Such an implementation could provide an advantage to a photojournalist who is trying to transfer captured images instantaneously to a news source. The utilization of wireless technology in this context also becomes an enabler for intermediate services. The transfer of images is not dependent on the camera manufacturer and will occur automatically.

In general, the user will set rules before transferring images. However, the user can also sort through the captured images and set the rules on a per-image basis. Setting rules beforehand is important for the wireless technology implementation because the user doesn't necessarily know when picture is being transmitted.

While the invention is described in terms of interaction between a computer system 200 and an image capturing device 10, the image capturing device 10 may transfer images to any selected computer system (such as other computer systems 300) based on the rules set by the user. Although the user may use the computer system 200 to set the rules for the image capturing device 10 as described below, the image capturing device 10 then may transfer captured images to another computer system having a structure similar to that described above with reference to the computer system 200. The receiving computer system will use its own rules engine to interpret the rules associated with the transferred images. The rules are preferably transferred in a standardized XML format. If the receiving rules engine 250 does not understand the transferred rules, it will consult standardized sources to interpret the rules. The sources may include device manufacturer websites or other vendor websites. For instance, although a receiving computer may not understand a rule, it will recognize it as a specific type of rule from a particular camera manufacturer or software vendor. Accordingly, the receiving system will go to the appropriate source URL to interpret the rule.

Figure 6:
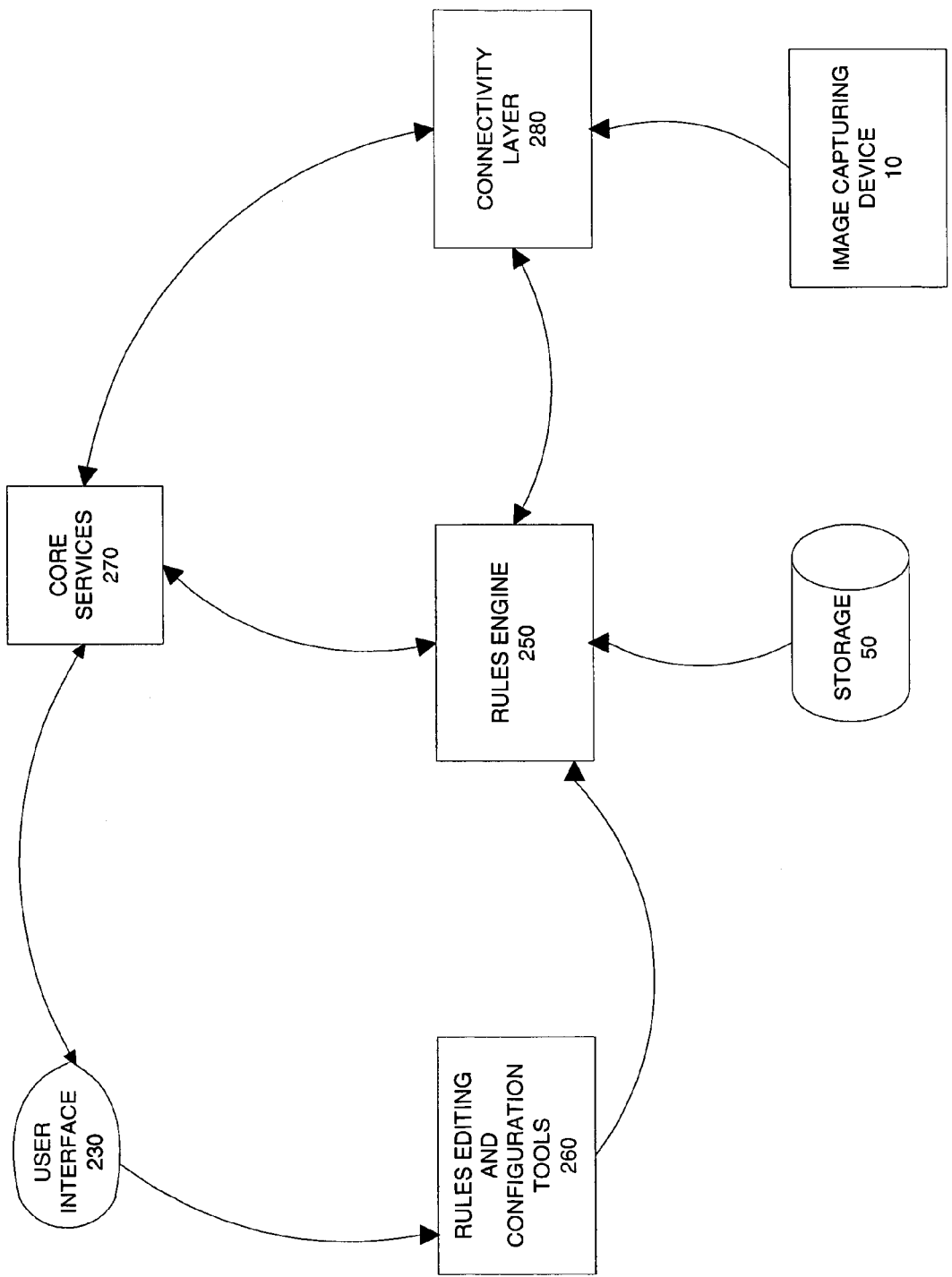
FIG. 6 is a block diagram showing interaction between the components of the computing system and the image capturing device in accordance with an embodiment of the invention.

FIG. 6 is a block diagram showing interaction between the above-identified components, both during rule selection and image transfer from the image capturing device 10. During rule selection, the user selects and configures rules through the user interface 230 using the rules editing and configuration tools 260 to update the rules engine 250. During a rule-setting session with the user, the rules editing and configuration tools 260 receive information from the user interface 230 and communicate rules to the rules engine 250. The rules engine 250 generally stores rules in a computing system storage area or in some cases may retrieve rules through the connectivity layer 280. The core services 270 provide the user interface 230 with rules selections and error messages.

During an image acquisition phase, the image capturing device 10 functions as a source of images and information on settings and parameters. The image capturing device 10 uploads this information to the connectivity layer 280. The rules engine 250 retrieves the rules from the appropriate computing system storage area or in some cases from the connectivity layer 280 and translates them into a standard XML-based form if necessary. The rules engine 250 interacts with the core services 270 to interpret and implement the rules. The core services 270 assists the user interface 230 in handling image acquisition tasks. The rules engine 250 retrieves image capture information from the connectivity layer 280. Furthermore, a storage system 50 may store rules in a standardized format and interact with the rules engine 250.

Although in many instances, the user will be setting the rules as set forth with reference to FIG. 6, it is also possible for an intermediate service provider to set the rules. For instance, in a tourist area, a photo shop might provide a pre-programmed digital camera. The purchaser would take photos as usual and subsequently return the camera. When the user accesses a computer system, the captured images would be available on a predetermined web site.

Figure 7:
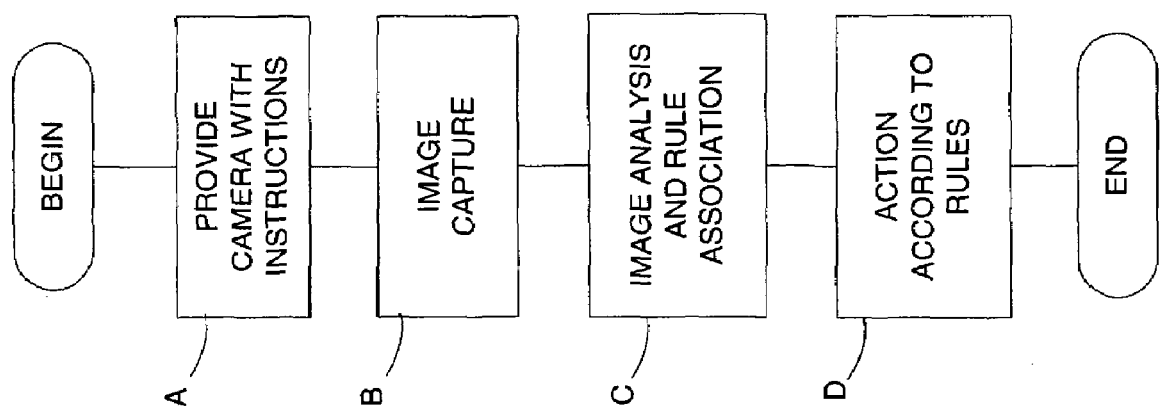
FIG. 7 is a flow chart illustrating a method of applying rules to digitally captured images in accordance with an embodiment of the invention.

FIG. 7 is a flow chart showing a generalized method for using the system 1 of the invention. Displayed procedures may occur in a variety of sequences and the displayed sequence is merely exemplary. In procedure A, the computing system 200 may receive instructions. As set forth above, the user may set the instructions through a user interface. Alternatively, the instructions may be pre-set by a device manufacturer or other third party. In procedure B, image capture occurs. In procedure C, the image capturing device 10 and/or computing system 200 performs image analysis and/or rule association. In procedure D, the rules are carried out in order to automatically process images in the pre-set manner.

Figure 8:
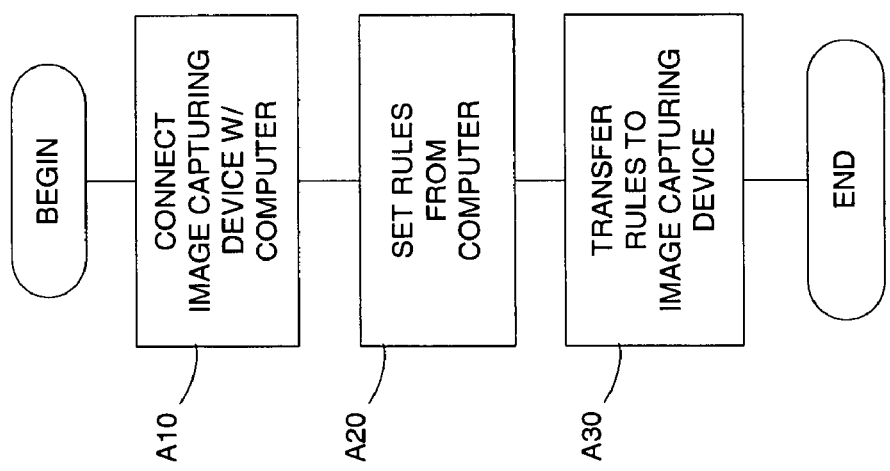
FIG. 8 is a flow chart illustrating one embodiment of a method for incorporating rules for image management in an image capturing device.

FIG. 8 is a flow chart illustrating an alternative embodiment of procedure A. In the alternative embodiment, the method includes providing the image capturing device 10 with rules for captured images. In step A10, the computer system 200 connects with the image capturing device 10. The image capturing device 10 may be plugged into the computer system 200 or may communicate via a wireless connection. In step A20, the rules are transferred from the computer system 200 to the image capturing device 10. In one embodiment, the user employs the user interface 230 to set the rules. The rules may be defined by the user or alternatively, a selection of rules may be provided to the user by the image capturing device manufacturer or software vendor. In step A30, the computer system 200 transfers the selected rules to the image capturing device 10.

Figure 9:
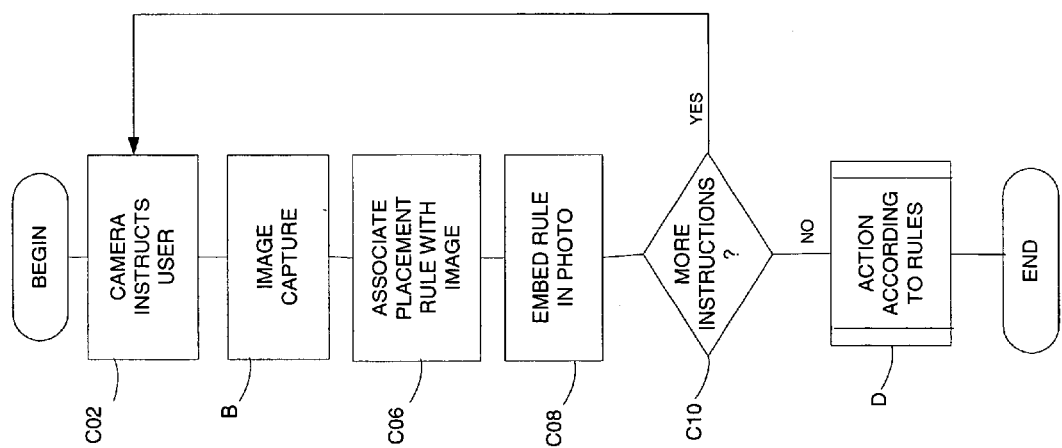
FIG. 9 is a flow chart illustrating an embodiment for implementing rules for image management.

FIG. 9 shows an embodiment of procedure C for using the system 1 after rules have been installed on the image capturing device 10. In this embodiment, the image capturing device 10 provides instructions to the user in step C02. The image capturing device 10 may instruct to the user to capture specific views of a subject image. In procedure B, the user captures the view as instructed. In step C06, the image capturing device 10 associates a placement rule with the captured image. In step C08, the image capturing device 10 embeds the placement rule in the captured image. In step C10, the process returns to step C02 if the image capturing device 10 provides additional instructions. If the image capturing device 10 does not provide additional instructions, image transfer occurs in accordance with procedure D. In an embodiment of procedure D, the image capturing device connects with the system 1 and transfers the image along with its rule to the designated computer system. The receiving computing system 200 conducts additional rule analysis as needed to regulate placement and enhancement of and access to the transferred images.

The embodiment of FIG. 9 may have particular applications for carrying out various pre-defined tasks. For example, an insurance adjuster could be given an image capturing device 10 such as a digital camera that has been loaded with rules from the rules engine 250. The camera may be able to instruct the insurance adjuster according to the rules program to take photographs at particular angles and of particular views. The camera then associates a placement rule 252 with each digital image. Subsequently, when the insurance adjuster attaches the camera to a docking station or when the insurance adjuster reaches a wireless hotspot, the images automatically reach their predetermined destinations. No interaction is required from the user to download photos. A similar example could apply to a real estate agent. A program from the system 200 could be loaded onto the image capturing device 10 to instruct the real estate agent which views of the subject property are necessary for a real estate web site. The rules and images are then automatically downloaded to the real estate website upon the detection of a connection.

Figure 10:
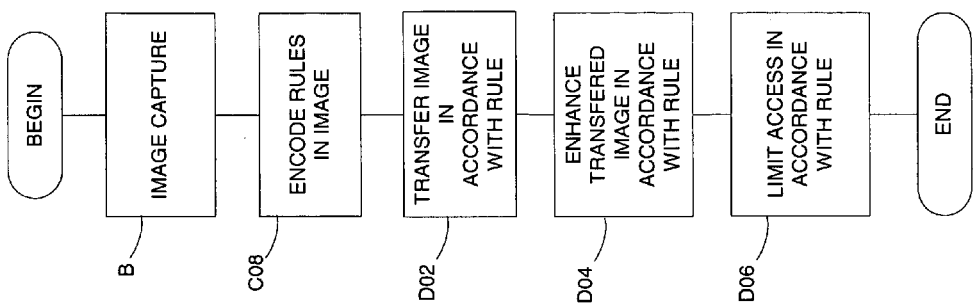
FIG. 10 is a flow chart illustrating an additional embodiment for implementing rules for image management.

FIG. 10 illustrates an alternative method for using the system 1 described above. In procedure B, the user captures images using image capturing device 10. In step C08, the image capturing device 10 encodes rules in the image. In step D02, the image capturing device 10 transfers the image to the computer system 200 and the computer system 200 transfers the image in accordance with the encoded rule. In step C04, the computer system 200 may use the enhancement rules 254 to enhance the image in accordance with the encoded rule. In step D06, the computer system 200 may limit access to pre-selected entities in accordance with rights management rules 258. If placement rules 252 indicate a specific file for predetermined content, the computer system 200 may also use the content analysis filters to direct the image to its final destination.

With respect to FIGS. 9 and 10, all of the aforementioned steps of procedures C and D could occur without transferring rules to the image capturing device 10. Instead, the steps would be carried out after image capture when the user re-connects the image capturing device 10 with the computing system 200.

The technique of the invention enables full utilization of desktop computing power for end user benefits dealing with a large number of incoming photographic images. The system removes the novice user from the equation. Users don't have to upload, reformat, file copying. Digital photography is still complicated. The system of the invention provides a platform in which the image has its own knowledge so that the user doesn't need to have knowledge. The system encapsulates extensible rules and encodes them inside an image file. The rules can be transmitted wirelessly or otherwise and can be interpreted by the receiving system.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

We claim:

1. A method for managing digital images, the method comprising:
   establishing a connection between a computing device and an image capturing device;
   defining a set of rules pertaining to an image, such that the set of rules governs actions performed upon a captured image;
   embedding at least one rule in the captured image, and applying the set of rules to the image captured by the image capturing device.

2. The method of claim 1, further comprising transferring the captured image to a receiving computing system and storing the captured image in accordance with an accompanying rule.

3. The method of claim 1, further comprising allowing a user to include a placement rule within the set of rules for determining a storage location for a captured image.

4. The method of claim 1, further comprising allowing a user to include an enhancement rule within the set of rules for optimizing the appearance of the captured image.

5. The method of claim 1, further comprising allowing a user to include a rights management rule within the set of rules for restricting access to the captured image.

6. The method of claim 1, further comprising allowing a user to define the set of rules using rules editing and configuration tools.

7. The method of claim 3, further comprising associating the placement rule with captured image content.

8. The method of claim 7, further comprising transferring the captured image, analyzing the captured image according to image content and storing the captured image in accordance with the placement rule.

9. A system for managing digital images, the system comprising:
   a rules engine that allows a user to configure a set of image rules for controlling images captured by an image capturing device and for embedding at least one rule in the captured image while the image is on the image capturing device; and
   connectivity tools for establishing a connection between the rules engine and the image capturing device and for transferring the images from the image capturing device and allowing application of the set of image rules to the images.

10. The system of claim 9, wherein the rules engine is located on a computing device including a user interface and rules editing and configuration tools for assisting a user in creating the set of image rules.

11. The system of claim 9, wherein the rules engine is located on a first computing device and the system further includes a receiving mechanism on a receiving computing device for receiving captured images from the image capturing device.

12. The system of claim 11, wherein the receiving computing device is the same as the first computing device.

13. The system of claim 11, wherein the receiving computing device receives captured images and interprets associated rules in order to determine actions to be performed on the captured images.

14. The system of claim 9, wherein the set of image rules includes a placement rule for determining a storage location for a captured image.

15. The system of claim 9, wherein the set of image rules includes an enhancement rule for optimizing the appearance of a captured image.

16. The system of claim 9, wherein the set of image rules includes a rights management rule for restricting access to a captured image.

17. The system of claim 14, further comprising a content filter for evaluating the placement rule based on captured image content.

18. A method for managing digital images, the method comprising:
   defining a set of rules using an image capturing device;
   storing at least one rule embedded in the transferred image;
   receiving a set of transferred images from the image capturing device; and
   applying the set of rules to the set of transferred images from the image capturing device.

19. The method of claim 18, further comprising transferring a captured image to a receiving computing system and storing the captured image in accordance with an accompanying rule.

20. The method of claim 18, further comprising allowing a user to include a placement rule within the set of rules, wherein the placement rule determines a storage location for an associated captured image.

21. The method of claim 18, further comprising allowing a user to include an enhancement rule within the set of rules, wherein the enhancement rule optimizes an appearance of an associated captured image.

22. The method of claim 18, further comprising allowing a user to include a rights management rule within the set of rules, wherein the rights management rule restricts access to an associated captured image.

23. The method of claim 18, further comprising allowing a user to define the set of rules using rules editing and configuration tools.

24. The method of claim 20, further comprising associating the placement rule with captured image content.

25. The method of claim 24, further comprising transferring the associated captured image, analyzing the associated captured image according to image content, and storing the associated captured image in accordance with the placement rule.

26. The method of claim 18, further comprising establishing a wireless connection for wireless transfer of the captured image.

27. A method for managing captured images stored on a computing device, the method comprising:
   receiving at least one captured image associated with an image rule at the computing device, wherein the associated image rule is embedded in the captured image;
   interpreting the associated image rule at the computing device; and
   managing the captured image in accordance with the associated image rule.

28. The method of claim 27, further comprising receiving the captured image over a wireless connection at the receiving computing device.

29. The method of claim 27, wherein interpreting the associated image rule comprises determining placement of the captured image.

30. The method of claim 29, wherein managing the captured image comprising storing the captured image in a pre-selected file.

31. The method of claim 27, wherein interpreting the associated image rule comprises determining enhancement of the captured image.

32. The method of claim 31, wherein managing the captured image comprises enhancing image quality of the captured image.

33. The method of claim 27, wherein interpreting the associated image rule comprises interpreting rights management instruction.

34. The method of claim 33, wherein managing the captured image comprises restricting access to the captured image to authorized users.

35. The method of claim 27, further comprising allowing a user to set the associated image rule prior to image capture.

36. The method of claim 27, further comprising allowing a user to set the associated image rule subsequent to image capture.

37. A system for managing captured images, the system comprising:
   an image transfer engine within an image capturing device for transferring a captured image and an embedded rule in said captured image;
   an image acquisition engine for receiving the captured image and the embedded rule; and a rules engine for interpreting the embedded rule in order to manage the captured image in accordance with the embedded rule.

38. The system of claim 37, wherein the embedded rule comprises a placement rule for determining placement of the captured image.

39. The system of claim 37, wherein the embedded rule comprises an enhancement rule for determining enhancement of the captured image.

40. The system of claim 37, wherein the embedded rule comprises a rights management rule.

41. The system of claim 37, further comprising rules editing and acquisition tools for allowing a user to set the embedded rule.

* * * * *

UNITED STATES PATENT AND TRADEMARK OFFICE
CERTIFICATE OF CORRECTION

| | | |
|---|---|---|
| PATENT NO. | : 7,362,462 B2 | Page 1 of 1 |
| APPLICATION NO. | : 10/608437 | |
| DATED | : April 22, 2008 | |
| INVENTOR(S) | : Vladimir Sadovsky et al. | |

It is certified that error appears in the above-identified patent and that said Letters Patent is hereby corrected as shown below:

In column 11, line 2, in Claim 5, delete "fights" and insert -- rights --, therefor.

Signed and Sealed this

Fifteenth Day of February, 2011

David J. Kappos
*Director of the United States Patent and Trademark Office*